United States Patent [19]

Roehl

[11] Patent Number: 4,500,363

[45] Date of Patent: Feb. 19, 1985

[54] METHOD OF EXTRACTING PERCHLORETHYLENE FROM DRY CLEANER FILTER CARTRIDGES

[76] Inventor: Ernest O. Roehl, 16262 Rascal La., Huntington Beach, Calif. 92649

[21] Appl. No.: 531,958

[22] Filed: Sep. 14, 1983

[51] Int. Cl.$^3$ ............................................. B01D 41/02
[52] U.S. Cl. ........................................... 134/10; 34/9; 134/11; 210/673; 210/282
[58] Field of Search ...................... 34/9; 210/673, 694, 210/266, 282, 232; 502/22; 134/10, 11

[56] References Cited

U.S. PATENT DOCUMENTS 3,670,424  6/1972  Hofer et al. ................................. 34/9
3,683,511  8/1972  Johnson et al. ............................ 34/9
4,014,104  3/1977  Murphy ...................................... 34/9
4,138,337  2/1979  Smith ..................................... 210/282
4,212,112  7/1980  LaDelfa et al. ............................ 34/9

Primary Examiner—Ivars Cintins
Attorney, Agent, or Firm—Cislo, O'Reilly & Thomas

[57] ABSTRACT

This invention relates to a new and unique method for the extraction and reclamation of perchlorethylene dry cleaning solvent from spent dry cleaner filter cartridges which utilize a layer of activated charcoal and paper filter media to perform the filtering function. The spent filter cartridges are separated into component parts. The charcoal and paper filter media are separated, collected and immersed in a boiling liquid solution contained in a boiling sump. The resulting perchlorethylene-laden vapors are collected and condensed to form a condensate. The condensate is allowed to settle by gravity into two homogeneous layers the upper layer of which contains water and the lower layer of which contains perchlorethylene in order to separate and collect the perchlorethylene for reuse or sale. The water in the upper layer is recycled into the boiling sump for reuse. The charcoal and filter media components are removed from the boiling sump, dried, and collected for recycling or sale.

9 Claims, No Drawings

METHOD OF EXTRACTING PERCHLORETHYLENE FROM DRY CLEANER FILTER CARTRIDGES

BACKGROUND OF THE INVENTION

1. Field of the Invention

This invention relates to a new and unique method for the extraction and reclamation of perchlorethylene dry cleaning solvent from spent dry cleaner filter cartridges which utilize a layer of activated charcoal and paper filter media to perform the filtering function.

2. Description of the Prior Art

Dry cleaner filter cartridges are used in the commercial dry cleaning process for the purpose of filtering dirt and lint from the perchlorethylene cleaning solvent. As garments are cleaned in the solvent within a dry cleaning machine, the solvent is pumped through the dry cleaner filter cartridges to entrap unwanted sediments.

Dry cleaner filter cartridges are generally cylindrical in shape and consist of an inner hollow metal tube, surrounded by a layer of activated charcoal contained in a larger diameter perforated metal tube, surrounded in turn by accordian-pleated paper filter media, all of which are encased within round metal end plates, and generally, a perforated cylindrical steel housing. (Only one manufacturer of dry cleaner filter cartridges known to the applicant does not use the perforated steel housings as described above.)

The present invention applies to all dry cleaning filter cartridges or filter inserts, including the three diferent size filter cartridges commonly used in the dry cleaning industry, i.e., the standard size having dimensions 7 3/4 inches in diameter by 14 3/8 inches long; the jumbo size having dimensions 13 1/4 inches in diameter by 18 1/4 inches long; and, the "split" size having dimensions 13 1/4 inches in diameter by 9 1/8 inches long. Dependent upon the volume of garment cleaning capacity for which a dry cleaning machine is designed, the number of filter cartridges used varies from machine to machine.

The dry cleaner filter cartridges are removed from the dry cleaning machine, from time to time, and replaced with new dry cleaner filter cartridges when the amount of dirt and lint entrapped within the filter media has increased to the point that the flow of cleaning solvent through the filter is impeded. This "clean-out" time is determined by a pressure increase shown on a pressure gauge installed on the dry cleaner filter cartridge canister.

All spent dry cleaner filter cartridges, when removed from the dry cleaning machine, contain residual perchlorethylene cleaning solvent. Manufacturers of dry cleaner machines recommend the dry cleaner operator reduce the amount of residual perchlorethylene cleaning solvent in the dry cleaner filter cartridges by allowing the dry cleaner filter cartridges to drain for a period of at least twenty-four hours. It is observed, however, that in actual practice most dry cleaner operators reduce the suggested drain time period. As a result, it has been discovered by test that the residual perchlorethylene cleaning solvent contained in dry cleaner filter cartridges selected at random from various dry cleaner operators varies on the average as follows:

| Filter Cartridge Size | Perchlorethylene Cleaning Solvent Residual in Discarded Dry Cleaner Filter Cartridges |
|---|---|
| 7 3/4" diameter by 14 3/8" long "standard" size | 0.5 to 1.5 gallons |
| 13 1/4" diameter by 18 1/4" long "jumbo" size | 2.0 to 4.0 gallons |
| 13 1/4" diameter by 9 1/8" long "split" size | 1.0 to 2.0 gallons |

Perchlorethylene cleaning solvent is identified as a toxic hazardous material by both federal (see the United States Environmental Protection Agency Resource Conservation and Recovery Act, 40 CFR, ∅250-265) and many state authorities (see, for example, California Health & Safety Code Annotated Chapters 6.5 and 13).

Generally, environmental disposal regulations require that after a hazardous material such as perchlorethylene cleaning solvent is used, it is considered to be a toxic hazardous waste material and must either be destroyed in a manner which will not leave any toxic hazardous waste material residues or else disposed of in a Class I landfill, which is required to have by law an impervious underlining to prevent the toxic hazardous waste material from percolating downward to contaminate an aquifer or the surrounding environment itself.

Examples of dangers caused by failure to properly dispose of toxic hazardous waste materials are seen in the national tragedies such as Stringfellow Chemical Pits in California, Love Canal in New York, or, Times Beach in Missouri where the full extent of damage to the ecosystem as well as to present and future generations of the nearby populace is still to be determined.

With these national tragedies still fresh in our minds, it is frightening to note the common method of disposal of spent perchlorethylene-laden dry cleaner filter cartridges throughout most of the United States is for the dry cleaner operator to illegally discard the dry cleaner filter cartridges with his common trash which is disposed of in Class II or Class III sanitary landfills.

Since landfills of these classes are not required to have impervious underlinings, contamination of aquifers and the environment from toxic hazardous perchlorethylene waste is possible. At the present time, only within certain areas of the State of California are dry cleaner operators forced, under penalty of fine, to enroll with a hazardous waste disposal service for the legal disposal of perchlorethylene-laden dry cleaner wastes.

It can be seen, then, that the extraction and reclamation of perchlorethylene from spent dry cleaner filter cartridges is desirable for two reasons. The first is cost reduction. The extracted perchlorethylene can be recycled for reuse, thus eliminating the need to purchase new replacement dry cleaning solvent.

The second reason is environmental. Although present legal codes allow for the disposal of perchlorethylene-laden wastes in Class I landfills, several states including Minnesota, Massachusetts and Pennsylvania, are considering legislation to prevent future land disposal of any perchlorethylene-laden wastes. Other states, including, California, have enacted legislation that restricts the level of concentration of perchlorethylene in wastes to be disposed of at any landfill to a maximum concentration of no more than 0.1% by weight.

Over the years, several methods have been used to extract perchlorethylene from dry cleaner filter cartridges. The first uses a drying cabinet with a vent connected to a carbon adsorption system. Dry cleaner filter cartridges are removed from the dry cleaning machine and placed within the drying cabinet where room air is drawn into the cabinet and around the cartridges. The perchlorethylene cleaning solvent is extracted from the solvent-laden air as it is passed through the carbon adsorption system.

The next method is similar to the above, except the dry cleaner filter cartridges are not removed from the dry cleaning machine for processing. The dry cleaner filter cartridges are left within the canister of the dry cleaning machine and room air is drawn into the canister and around and through the cartridges. As above, the perchlorethylene cleaning solvent is extracted from the solvent-laden air as it is passed through an external carbon adsorption system.

Also in use is a hot air recirculating system, wherein the dry cleaner filter cartridges are left within the canisters of the dry cleaning machines. Hot air, heated by an external source, is forced through the canisters holding the dry cleaner filter cartridges. The perchlorethylene cleaning solvent is extracted from the solvent-laden air as it is passed through an external water-cooled condenser or carbon adsorption system.

The final method to be described employs live steam injection wherein the dry cleaner filter cartridges are left within the canister of the dry cleaning machine. The canister is tightly sealed and, live steam is injected into the canister to maintain a pressure within the canister of 1.75 to 3.0 pounds per square inch. The resulting perchlorethylene vapor is passed through a pipe connected to an external water-cooled condenser and condensed and collected.

The above-described methods outline the state of the art developments in the art of perchlorethylene reclamation from dry cleaner filter cartridges since 1971 when efforts were first instituted to extract and reclaim perchlorethylene dry cleaning solvent from dry cleaner filter cartridges. Each of the above-described methods is time consuming, for example, a period of four and three-quarter hours for the steam injection method to twenty-four to forty-eight hours for the other methods is suggested to effectively extract the perchlorethylene cleaning solvent from the dry cleaner filter cartridges. None of the manufacturers of the equipment used in the above methods claim all perchlorethylene solvent is removed from the dry cleaner filter cartridges following the processing. All of the methods require the processed dry cleaner cartridges be discarded in a landfill following processing, which shall be illegal if and when, laws are enacted requiring zero hazardous material content for landfill disposal. All of the above-described methods process the dry cleaner filter cartridges in their assembled configuration as opposed to the disjoined configuration taught herein.

SUMMARY AND OBJECTS OF THE INVENTION

It is an object of the invention to provide a method for extracting and reclaiming perchlorethylene cleaning solvent from used or spent dry cleaner filter cartridges which utilize a layer of activated charcoal and paper filter media to perform the filtering function.

It is another object of the invention to provide a method for extracting and reclaiming perchlorethylene cleaning solvent from spent dry cleaner filter cartridges to the extent that all the components forming the processed dry cleaner filter cartridges can be recycled as non-toxic hazardous waste materials thereby satisfying ecological concerns about environmental pollution caused by the disposal of perchlorethylene-laden dry cleaning filter cartridges.

It is another important object of the invention to provide a method to process perchlorethylene-laden spent or used dry cleaner filter cartridges so that they may be recycled thereby conserving valuable resources, energy and even possibly generating an economic benefit to the seller from what was previously an environmental, as well as economic, detriment.

It is still yet another important object of the invention to provide a method for extracting and reclaiming perchlorethylene cleaning solvent from used or spent dry cleaner filter cartridges that permits the extraction and reclamation of perchlorethylene-cleaning solvent from a plurality of dry cleaner filter cartridges simultaneously in a processing period considerably shorter than any processing method currently used in the art.

In an exemplary embodiment, the invention is directed to a method for extracting perchlorethylene dry cleaning fluid from spent dry cleaner filter cartridges which comprises the steps of:

Disjoining the spent dry cleaner filter cartridges into housing components, charcoal components and filter media components;

Immersing said charcoal and said filter media components into a boiling chamber having water therein;

Maintaining said perchlorethylene/water mixture at a temperature equivalent to the boiling point of the perchlorethylene/water azeotrope to produce perchlorethylene containing vapors;

Condensing said perchlorethylene containing vapors into a condensate, collecting said condensate into a drying tank; separating the perchlorethylene from said water in said condensate; and Collecting said perchlorethylene into a collecting container.

In another embodiment the invention is directed to a method of extracting and reclaiming perchlorethylene from spent dry cleaner filter cartridges which utilize a layer of activated charcoal and paper filter media to perform the filtering/cleaning function comprising the steps of:

Disjoining the spent dry cleaner filter cartridges into housing components, charcoal components and filter media components;

Collecting said charcoal components and said filter components into separate permeable basket-like containers; immersing said separate permeable basket-like containers into a boiling chamber having a liquid solvent therein; maintaining said perchlorethylene/water mixture at a temperature equivalent to the boiling point of the perchlorethylene/water azeotrope to produce perchlorethylene-containing vapors; collecting said perchlorethylene-containing vapors into a condensing zone; condensing said perchlorethylene-containing vapors into a condensate; collecting said condensate into a drying tank;

Separating and collecting said perchlorethylene into a collecting container;

These and other objects of the invention will become more apparent from the hereinafter following commentary.

DESCRIPTION OF THE BEST EMBODIMENTS CONTEMPLATED

In the method of extracting perchlorethylene dry cleaning solvent from spent dry cleaner filter cartridges the dry cleaner filter cartridge is first separated into its component parts for processing. This separation is accomplished by sawing off the end plates of the dry cleaner filter cartridge using a band saw or similar machine. An alternate equally acceptable method of separating the dry cleaner filter cartridge into its component parts is by using mechanical or pneumatically operated devices that break the spot welds holding the outer filter cartridge housing together, or by cutting away the end plates of the outer filter cartridge housing with an electric shearing device.

By whatever method is used, the end plates of the outer housing of the filter cartridge are removed and the internal filter cartridge structure is separated from the outer housing. The charcoal filtering material is separated and collected in a permeable basket-like container for processing. Similarly, the filter media is separated and collected in another permeable basket-like container for processing. The outer housing end plates, the outer housing itself and any remaining internal structural components of the now disjoined filter cartridge are collected and placed in a convenient area for sale to a scrap dealer or recycling and reuse center.

While the machine used for processing the perchlorethylene-laden charcoal and filter media components collected above can be of different configurations, we will describe the process of the invention using a machine similar to a conventional vapor degreasing apparatus.

In the conventional degreasing apparatus, a boiling chamber or sump contains a boiling solvent such as water and has a heating element, thereby forming a boiling zone. Positioned above the boiling zone is a vapor condensation zone wherein condensing coils and a cooling jacket may be employed to condense vapors therein.

A necessary step in the process is to separate the perchlorethylene from the collected perchlorethylene/water condensate by allowing the condensate to settle in the collecting tank thereby separating and forming two distinct homogeneous layers the lower of which contains the heavier perchlorethylene and the upper of which contains the lighter water.

In practice, the process disclosed above occurs in the following manner. The spent filter cartridges are first removed from their shipping containers which are usually sealed steel drums. Then, in an enclosure whose air is exhausted through a carbon absorption system they are disassembled by using a band saw to remove both ends of the filter cartridges. The steel end plates and center tube of the filter cartridges are placed in a collection bin for later sale to a scrap dealer or recycling plant. The charcoal filter elements are removed and collected in a mesh processing basket. The cylindrically shaped paper filter elements are now removed from the steel housing, unrolled and layed flat in a second mesh processing basket. Currently, the mesh processing baskets used have approximate dimensions of 3'×3'×4' deep and are filled to a depth of approximately 3'. By disassembling the cartridges and pouring the charcoal into one basket and unrolling the filter paper into a second basket, four times the number of cartridges can be placed in the same cubic volume as with cartridges which are not disassembled. The processing baskets are now lifted by a hoist or similar machine and lowered into the distillation tank, which is an open topped vat approximately 12' long, 4' wide and 11' deep with approximately 3' depth of water therein. Peripheral water cooled condensing coils are located approximately 2' below the lip of the vat. A trough is located directly below the condensing coils in order to collect condensate. The trough is plumbed to an external water separator tank. In operation, live steam is injected into the vat to heat the water to the boiling point of the perchlorethylene/water azeotrope, approximately 88.5° C., where the azeotrope vaporizes. The azeotrope vapors as they rise are condensed onto the water cooled condensing coils. The condensate is collected in the trough below the coils and the condensate passed through a pipe to an external water separator. The perchlorethylene/water azeotrope has, by test examination, a composition of 82.8% perchlorethylene and 17.2% water and separates into two homogeneous layers. The separated perchlorethylene flows from the water separator to a separate storage tank for later resale. The separated water flows back to the distillation tank for reuse. After approximately thirty to sixty minutes of processing time, the processing baskets containing the filter paper and the charcoal are hoisted from the distillation tank and placed on a grid over a drain tank to allow the water to drain from the material. The drained water is then pumped back into the distillation tank for reuse. The filter paper is emptied from the filter paper processing basket into a bin for sale to a pulp paper processer. Likewise, the charcoal is emptied from the charcoal processing basket into fifty-five gallon drums for later sale to a charcoal reactivator.

Laboratory tests performed on the charcoal and filter media processed by the method of the invention taught herein have shown that the residual perchlorethylene in the processed charcoal and filter media is nil.

Although the process of the invention has been described in use in a machine similar in design to an open-top industrial vapor degreasing apparatus having an internal condensing coil and a collecting trough for condensate collection, the process as described may also be performed in an apparatus having a vat member with a hinged lid and fitted with a vapor column and an external condenser.

All modifications and changes that will become apparent to those of ordinary skill in the art are intended to be covered by the appended claims.

I claim:

1. A method of removing perchlorethylene dry cleaning fluid from spent dry cleaner filter cartridges which comprises the steps of:
   (a) Disjoining the spent dry cleaner filter cartridges into housing components, charcoal components and filter media components;
   (b) Immersing said charcoal and said filter media components into a boiling chamber having water therein;
   (c) Maintaining said perchlorethylene/water mixture at a temperature equivalent to the boiling point of said perchlorethylene/water azeothrope to produce perchlorethylene-containing vapors;
   (d) Condensing said perchlorethylene-containing vapors into a condensate;
   (e) Collecting said condensate into a drying tank;
   (f) Separating the perchlorethylene from said water in said condensate; and (g) Collecting said perchlorethylene into a collecting container.

2. The process in accordance with claim 1 where separating the perchlorethylene from said liquid solvent in said condensate is accomplished by gravity separation.

3. The process in accordance with claim 2 wherein said perchlorethylene/water mixture is maintained at a temperature of the boiling point of the perchlorethylene/water azeothrope.

4. The process in accordance with claim 2 wherein the step of condensing said perchlorethylene-containing vapors into a condensate is accomplished by the use of a series of cooling coils.

5. The process in accordance with claim 2 wherein the step of condensing said perchlorethylene-containing vapors into a condensate is accomplished by the use of at least one cooling jacket.

6. The process in accordance with claim 1 which additionally includes a step of collecting said charcoal and said filter media into respective separate containers.

7. The process in accordance with claim 6 wherein said containers are permeable to said water contained in said boiling chamber.

8. The process in accordance with claim 6 wherein said containers are formed from wire mesh having spacing sufficient to prevent said charcoal and said filter media components contained therein from passing through said wire mesh.

9. A method of extracting and reclaiming perchlorethylene from spent dry cleaner filter cartridges which utilize a layer of activated charcoal and filter media to perform the filter/cleaning function comprising the steps of:
- (a) Disjoining the spent dry cleaner filter cartridges into housing components, charcoal components and filter media components;
  Collecting said charcoal and said filter media components into separate water permeable basket-like containers;
- (b) Immersing said separate basket-like containers containing said charcoal and said filter media components into a boiling chamber having water therein;
- (c) Maintaining said perchlorethylene/water mixture at a temperature equivalent to the boiling point of said perchlorethylene/water azeotrope to produce perchlorethylene-containing vapors;
- (d) Collecting said perchlorethylene-containing vapors into a condensing zone;
- (e) Condensing said perchlorethylene-containing vapors into a condensate;
- (f) Collecting said condensate into a holding tank;
- (g) Separating said perchlorethylene from said water in said condensate by gravity separation; and
- (h) Collecting said perchlorethylene into a collecting container.

* * * * *